(12) United States Patent
Koide et al.

(10) Patent No.: US 7,133,236 B2
(45) Date of Patent: Nov. 7, 2006

(54) STORAGE DEVICE CONTROL METHOD, MOTOR CONTROL METHOD, AND STORAGE DEVICE

(75) Inventors: Nobuhisa Koide, Kanagawa (JP); Gaku Ikedo, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/030,700

(22) Filed: Jan. 5, 2005

(65) Prior Publication Data

US 2005/0162773 A1 Jul. 28, 2005

(30) Foreign Application Priority Data

Jan. 27, 2004 (JP) .............................. 2004-017993

(51) Int. Cl.
    *G11B 15/46* (2006.01)
(52) U.S. Cl. .................................................. 360/73.03
(58) Field of Classification Search ............. 360/73.03, 360/78.07, 75, 71, 73.01, 73.08, 73.09; 318/268, 318/254, 597, 700, 803; 369/53.42
    See application file for complete search history.

(56) References Cited

U.S. PATENT DOCUMENTS

| | | | | |
|---|---|---|---|---|
| 5,001,578 A | * | 3/1991 | Yamauchi | 360/73.03 |
| 5,298,840 A | * | 3/1994 | Yoshino et al. | 318/268 |
| 5,636,193 A | * | 6/1997 | Ohmi | 369/53.42 |
| 5,936,787 A | * | 8/1999 | Ohmi | 360/73.03 |
| 6,065,231 A | * | 5/2000 | Suzuki et al. | 318/700 |
| 6,163,118 A | * | 12/2000 | Chen et al. | 318/254 |
| 6,411,056 B1 | * | 6/2002 | Ikedo et al. | 318/597 |
| 6,624,964 B1 | * | 9/2003 | Pirzadeh | 360/78.07 |
| 6,697,207 B1 | * | 2/2004 | Harmer | 360/75 |
| 6,801,382 B1 | * | 10/2004 | Kimura et al. | 360/73.03 |
| 2002/0159184 A1 | * | 10/2002 | Shigematsu | 360/71 |
| 2004/0004782 A1 | * | 1/2004 | Kisaka | 360/73.03 |

FOREIGN PATENT DOCUMENTS

| | | |
|---|---|---|
| JP | 10-064184 | 3/1998 |
| JP | 2001-014789 | 1/2001 |

* cited by examiner

*Primary Examiner*—Fred F. Tzeng
(74) *Attorney, Agent, or Firm*—Townsend and Townsend and Crew LLP; Patrick Duncan (57) ABSTRACT

Embodiments of the invention avoid erroneous drive current control at the time of a change in the drive waveform for a spindle motor. In one embodiment, a drive current setup section acquires the actual rotational speed from a rotational speed determination section. If the drive waveform is not changed, the feedback system for a first gain determines a drive current. Drive current data corresponding to the drive current is set in a register. If the drive waveform data switches to a curved wave during the next timing cycle, the feedback system does not perform any process, but the same drive current data as for the immediately preceding timing cycle is set in the register. During the next timing cycle, the actual rotational speed is acquired from the rotational speed determination section, and the feedback system for a second gain determines the drive current. When the drive waveform data changes, the feedback system process is skipped once. Therefore, erroneous drive current control can be avoided at the time of a drive waveform change.

26 Claims, 7 Drawing Sheets

STORAGE DEVICE CONTROL METHOD, MOTOR CONTROL METHOD, AND STORAGE DEVICE

CROSS-REFERENCES TO RELATED APPLICATIONS

This application claims priority from Japanese Patent Application No. JP2004-17993, filed Jan. 27, 2004, the entire disclosure of which is incorporated herein by reference.

BACKGROUND OF THE INVENTION

The present invention relates to a storage device control method, motor control method, and storage device, and more particularly to a storage device control method, motor control method, and storage device for changing a drive current waveform.

It is known that information recording/reproducing devices use various types of media such as optical disks and magnetic tapes. Among others, hard disk drives are widely used as a computer's storage device and recognized as being essential to the present-day computer systems. Owing to their excellent characteristics, the hard disk drives have found increasingly wide applications including computers, motion picture storage/reproducing devices, car navigation systems, and removable memories for use, for instance, in digital cameras.

A hard disk drive comprises a magnetic disk for storing data, a spindle motor for rotating the magnetic disk, a magnetic head for reading data stored on the magnetic disk and/or writing data onto the magnetic disk, and an actuator to which the magnetic head is fastened. The actuator is driven by a voice coil motor (VCM). The actuator pivotally moves on a pivot to move the magnetic head. To read/write data, the actuator moves the magnetic head to a data area on a rotating surface of the magnetic disk. The magnetic head has a recording/reproducing thin-film element and a slider. The pressure produced by the stiction of the air between the slider's ABS (Air Bearing Surface), which faces the magnetic disk, and the rotating magnetic disk properly balances with the pressure that the actuator applies toward the magnetic disk. As a result, the magnetic head flies above the magnetic disk with a fixed air gap.

The spindle motor is controlled for its driving by a CPU and a spindle motor driver (SPM driver). In compliance with a command from the CPU, the SPM driver provides control over spindle motor startup and rotation. When the actual rotational speed of the spindle motor is detected, feedback control is exercised to control the rotation of the spindle motor. While no data read/write process is performed during the use of a hard disk drive based on the load/unload technology, the magnetic head rests on a ramp mechanism positioned outside the magnetic disk. When a storage area on the magnetic disk needs to be accessed, the actuator turns to move the magnetic head from the ramp mechanism to a position above the magnetic disk. When the magnetic head moves to a position above the magnetic disk, air friction occurs between the magnetic head and magnetic disk. This air friction causes a change in the rotation of the magnetic disk.

A technology for controlling a change in the rotation of the magnetic disk, which may be caused by the above-mentioned loading operation, is disclosed by Japanese Patent Laid-open No. 2001-14789. When head load control is exercised in a load/unload type disk drive, the control gain of a feedback control system for the spindle motor is set to a high level. When the rotation reaches its steady state, the control gain is restored to the normal level. In the head loading sequence, the CPU increases the control gain to provide improved response to disturbance for the purpose of controlling a rotational change. When the controlled rotational change is within an acceptable range, the CPU restores the control gain to its normal level for the purpose of maintaining feedback control system stability.

In the magnetic head loading sequence, the control gain is increased to provide improved response to disturbance for the purpose of exercising rotational change control. When the control gain increases, feedback control system stability may decrease to incur oscillation. Therefore, when the controlled rotational change is within an acceptable range, the control gain is restored to its normal level. When the magnetic head is loaded onto the magnetic disk for data recording/reproducing purposes, the rotation of the spindle motor changes due to disturbance caused by the force of air friction between the magnetic head and magnetic disk. However, the use of the above configuration makes it possible to control such a change in the rotation of the spindle motor within a short period of time.

BRIEF SUMMARY OF THE INVENTION

There is a known technology for changing the waveform of a drive current during spindle motor drive control. For example, the spindle motor is driven by a square wave drive current at startup, and the drive waveform is changed from a square wave to a curvilinear wave (curved wave) in a steady-state rotation state. Since the curved wave has a limited amount of high-frequency components, it is possible to minimize the noise that is generated by spindle motor rotation. The drive waveform is generally changed when an unloaded magnetic head is parked on the ramp mechanism. The inventors have found that there is a problem with spindle motor drive control when the drive waveform is changed while the magnetic head is positioned above the magnetic disk, for instance, after loading in a load/unload type disk drive.

In spindle motor rotation control, the actual rotational speed is detected by detecting a back electromotive voltage that is induced on a spindle motor coil. The spindle motor's feedback control system controls the drive current to be supplied to the spindle motor in such a manner that the detected rotational speed coincides with a target speed. Since a change in the drive current waveform disturbs the back electromotive voltage to be detected, the spindle motor rotational speed may not accurately be detected at the time of a drive current waveform change. Therefore, when the drive current waveform is changed after the start of loading, the feedback control system detects an incorrect rotational speed so that an incorrect drive current is supplied to the spindle motor. As a result, the magnetic disk rotational speed greatly varies.

The present invention has been made in view of the above circumstances, and it is a feature of the invention to apply an effective drive waveform change during motor control.

In a first aspect of the present invention, a storage device control method for a storage device, which includes a storage disk, a motor for rotating the storage disk, and a head for accessing a storage area of the storage disk, comprises: (a) acquiring a signal for detecting the rotational speed of the motor; (b) determining the rotational speed of the motor in accordance with the acquired signal; (c) comparing the determined rotational speed against a target speed and determining a drive current that is to be supplied to the motor with predefined timing; (d) changing the waveform of the drive current to be supplied to the motor; and (e) determining, during the first timing cycle after the waveform change, the drive current to be supplied to the motor independently of the signal for the rotational speed detection after the waveform change. Since a drive current determination process after the waveform change is performed independently of the signal for rotational speed detection, it is possible to avoid incorrect drive current determination, which could result from a disturbed signal waveform.

In some embodiments, the drive current determined in step (e) above is the same as the drive current that is determined during a timing cycle immediately preceding the first timing cycle after the waveform change. Alternatively, step (d) above is performed to change the waveform of the drive current to be supplied to the motor during a timing cycle during which the head is positioned above the storage disk which is rotating. It is preferred that the storage device control method further comprise acquiring servo data from the storage disk, and that step (d) above be performed to change the waveform of the drive current during a timing cycle that is determined according to the servo data. Further, it is preferred that step (d) above be performed to change the waveform of the drive current during a timing cycle during which servo data is successively acquired a predetermined number of times.

In specific embodiments, the storage device control method further comprise moving, prior to step (d) above, the head from the outside of the magnetic disk to a position above the magnetic disk which is rotating, and step (d) above is performed to change the waveform of the drive current to be supplied to the motor during a timing cycle during which the head is positioned above the storage disk which is rotating. It is preferred that the waveform of the drive current change from a first waveform to a second waveform in step (d) above, and that the maximum current value of the first waveform be smaller than the maximum current value of the second waveform. Alternatively, it is preferred that the storage device control method further comprise repeating steps (a) through (c) above after completion of step (e) above, and that a feedback process for a first gain be performed to determine the drive current in step (c) that precedes step (e), and further that a feedback process for a second gain, which is smaller than the first gain, be performed to determine the drive current in step (c) that follows step (e).

In some embodiments, the waveform of the drive current changes from a first waveform to a second waveform in step (d) above, and the slew rate of the second waveform is lower than the slew rate of the first waveform.

In a second aspect of the present invention, a motor control method comprises: (a) acquiring a signal for detecting the rotational speed of a motor from the motor; (b) determining the rotational speed of the motor in accordance with the acquired signal; (c) determining, in accordance with the difference between the determined rotational speed and a target speed, a drive current that is to be supplied to the motor; (d) supplying the determined drive current to the motor; (e) changing the waveform of the drive current to be supplied to the motor; (f) determining, during the first timing cycle after the waveform change, the drive current to be supplied to the motor independently of the signal for the rotational speed detection after the waveform change; and (g) supplying to the motor the drive current that is determined after the waveform change. Since a drive current determination process after the waveform change is performed independently of the signal for rotational speed detection, it is possible to avoid incorrect drive current determination, which could result from a disturbed signal waveform.

In some embodiments, the drive current determined in step (f) above is the same as the drive current that is determined during a timing cycle immediately preceding the first timing cycle after the waveform change. Alternatively, the signal for the rotational speed detection is generated when a voltage induced on a coil of the motor is detected.

In a third aspect of the present invention, a storage device includes a storage disk, a motor for rotating the storage disk, and a motor control section for controlling the motor. The motor control section comprises a signal acquisition section for acquiring a signal generated according to the rotational of the motor from the motor; a rotational speed determination section for determining the rotational speed of the motor in accordance with the acquired signal; a waveform determination section for determining the waveform of a drive current that is to be supplied to the motor; a drive current determination section for determining, in accordance with the rotational speed determined by the rotational speed determination section and a predetermined rotational speed, a drive current value that is to be supplied to the motor with predefined timing, and determining, during the first timing cycle after a change in the waveform of the drive current, the drive current value independently of the signal prevailing after the drive waveform change; and a drive section for supplying to the motor a drive current that corresponds to the drive current value determined by the drive current determination section and the drive waveform determined by the waveform determination section. Since a drive current determination process after the waveform change is performed independently of the signal for rotational speed detection, it is possible to avoid incorrect drive current determination, which could result from a disturbed signal waveform.

In some embodiments, the storage device further comprises a head for accessing a storage area of the disk, and the drive waveform changes during a timing cycle during which the head is positioned above the disk. It is preferred that the storage device further comprise a servo data acquisition section for acquiring servo data from the storage disk, and that the drive waveform determination section change the drive waveform from a first drive waveform to a second drive waveform during a timing cycle that is determined according to the acquired servo data.

In specific embodiments, the storage device further comprises a head for accessing a storage area of the disk and a movement mechanism for moving the head, and when the head is positioned above the disk after being moved by the movement mechanism from the outside of the disk to a position above the disk which is rotating, the drive waveform determination section determines the drive waveform in such a manner that the drive waveform changes from a first drive waveform to a second drive waveform, and further the maximum current value of the first drive waveform is smaller than the maximum current value of the second drive waveform.

In specific embodiments, the storage device further comprises a head for accessing a storage area of the disk and a movement mechanism for moving the head. It is preferred that, when the head is positioned above the disk after being moved by the movement mechanism from the outside of the disk to a position above the disk which is rotating, the drive waveform determination section determine the drive waveform in such a manner that the drive waveform changes from a first drive waveform to a second drive waveform, and that the drive current determination section cause a feedback system to determine the drive current value in such a manner that the rotational speed determined by the rotational speed determination section approximates the predetermined rotational speed, and further that the gain of the feedback system for the first drive waveform be higher than the gain of the feedback system for the second drive waveform.

In some embodiments, the drive current value that the drive current determination section determines during the first timing cycle after a change in the waveform of the drive current is the same as the drive current value that is determined during a timing cycle immediately preceding the first timing cycle.

The present invention can effectively change the drive waveform during motor control.

DETAILED DESCRIPTION OF THE INVENTION

Embodiments of the present invention will now be described. However, the following description of the embodiments is to be considered in all respects only as illustrative and not restrictive. The present invention is not limited to the embodiments described below. For purposes of clarity and understanding, the following description and the accompanying drawings are abbreviated or simplified as appropriate. It will be apparent to those skilled in the art that various changes, additions, and modifications may be readily made to the elements of the following embodiments without departing from the spirit and scope of the present invention. For brevity and clarity, like elements in the drawings are designated by like reference numerals and will not be described repeatedly.

Figure 1:
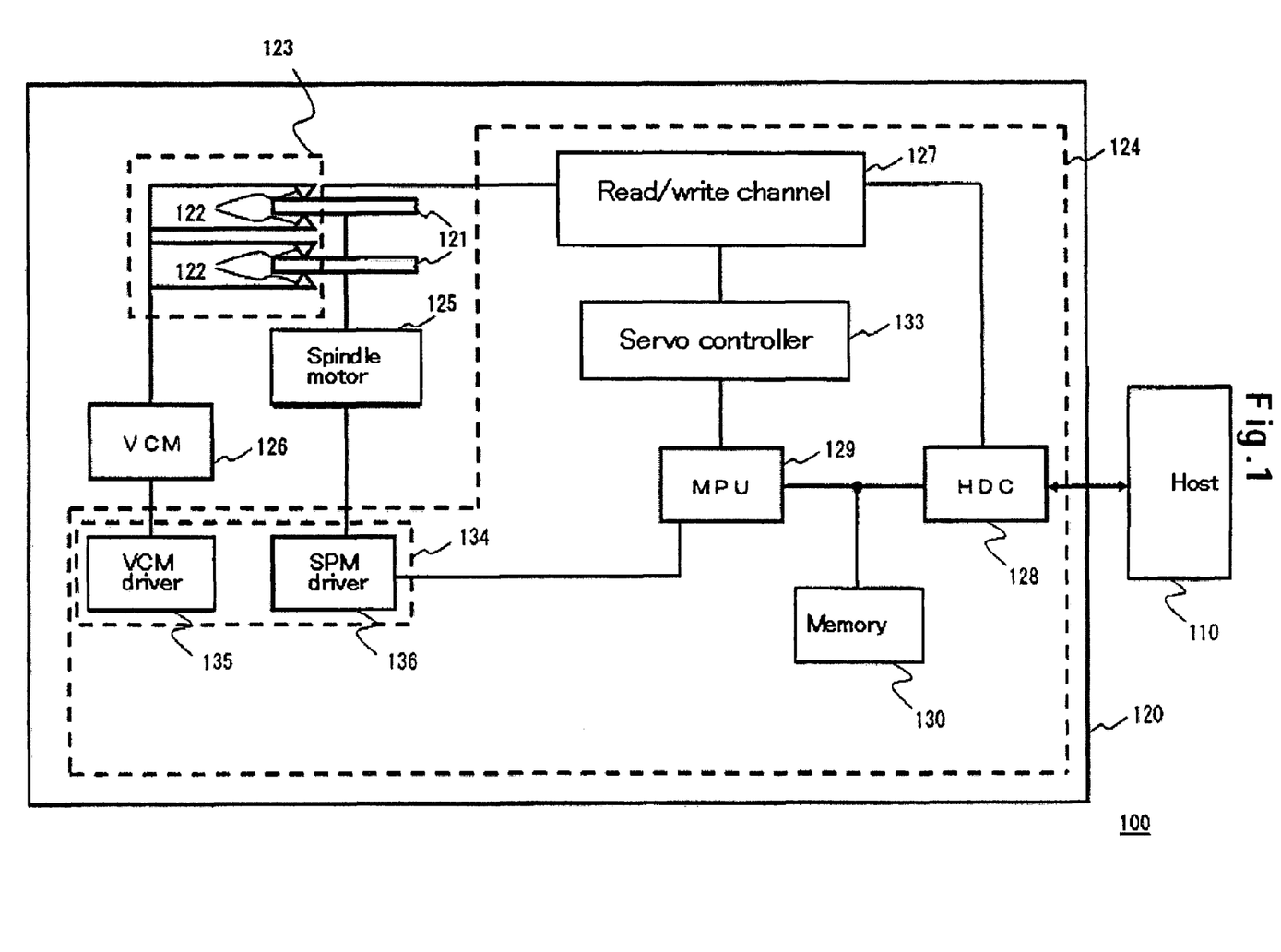
FIG. 1 is a block diagram that illustrates the logical configuration of a hard disk drive according to one embodiment of the present invention.

FIG. 1 schematically shows the configuration of a data processing system according to one embodiment of the present invention. The data processing system 100 includes a host 110 such as a computer or digital camera for data processing and a hard disk drive 120, which is a data storage device for storing data transmitted from the host 110. The housing for the hard disk drive 120 contains a head stack assembly 123, which comprises one or more magnetic disks 121 and magnetic heads 122 for magnetic disk recording surfaces.

Each magnetic head 122 includes a write element and a read element. The write element converts an electrical signal to a magnetic field in accordance with data stored on a magnetic disk 121. The read element converts a magnetic field generated from a magnetic disk 121 to an electrical signal. Further, each magnetic head 122 has a slider. The write element and read element are formed on the surface of the slider. For explanation purposes, the head stack assembly 123 contains four magnetic heads 122. However, the head stack assembly 123 may contain one or any plurality of magnetic heads. The hard disk drive 120 includes a controller 124, which controls the above elements in order to write data onto the magnetic disks 121 or read data from the magnetic disks 121.

Host user data transmitted from the host 110 is processed as needed by the controller 124 for conversion to a write signal and then forwarded to the head stack assembly 123. In accordance with the acquired write signal, the magnetic head 122 writes data onto the recording surface of the magnetic disk 121. Meanwhile, a read signal, which is read from the magnetic disk by the magnetic head 122, is converted to a digital signal by the controller 124, processed as needed, and then transmitted to the host 110.

The magnetic disk 121 is a nonvolatile recording medium whose magnetic layer becomes magnetized to record data. While the hard disk drive 120 is operating, the magnetic disk is driven to rotate around the spindle of a spindle motor 125 at a specified speed. While the hard disk drive 120 is not operating, the magnetic disk 121 is at a standstill. A plurality of tracks are concentrically formed on the surface of the magnetic disk 121 to serve as data storage blocks. Each track comprises a plurality of sectors that are arranged in circumferential direction.

A servo data storage area is formed on the surface of the magnetic disk 121. Typically, the magnetic disk 121 has a plurality of servo data storage areas that are formed radially. Each sector contains a servo data storage area and a user data storage area. When the magnetic head 122 reads servo data, the positional information about the magnetic head 122 is obtained. The servo data includes track data, which contains track number information, sector data, which contains sector number information, and a burst pattern.

The head stack assembly 123 is mounted within a frame so that it can pivotally move over the surface of the magnetic disk 121. The head stack assembly 123 is driven by a voice coil motor (VCM) 126. The magnetic head 122, which includes the slider and thin magnetic film element, is mounted at the tip of the head stack assembly 123. When the head stack assembly 123 pivotally moves, the magnetic head 122 moves radially over the surface of the magnetic disk 121. In this manner, the magnetic head 122 is allowed to access a desired track.

In the example shown in FIG. 1, the head stack assembly 123 contains two magnetic heads 122 for each magnetic disk 121. These magnetic heads respectively relate to the front and back surfaces of the magnetic disk 121. Each magnetic head 122 writes data onto a magnetic disk 121 or reads servo data and user data from a magnetic disk 121. While a magnetic head 122 of a load/unload type disk drive is performing no data write/read process, it is parked on the ramp mechanism (not shown), which is positioned outside the magnetic disk 121. If a storage area of the magnetic disk 121 needs to be accessed, the head stack assembly 123 turns to move the magnetic head 122 to a position above the magnetic disk 121. In this respect, a detailed description will be given with respect to motor control. The subsequent description relates to a load/unload type hard disk drive 120. However, the motor control method according to the present invention can also be applied to the CSS (Contact Start and Stop) mode. In the CSS mode, the magnetic head 122 is parked in a CSS zone, which is provided in an inner circular area.

As shown in FIG. 1, the controller 124 comprises a read/write channel 127, a hard disk controller (HDC) 128, a microprocessor unit (MPU) 129, a memory 130, a servo controller 133, and a motor driver unit 134. The motor driver unit 134 comprises a voice coil motor driver (VCM driver) 135 and a spindle motor driver (SPM driver) 136.

The read/write channel 127 performs a write process on data acquired from the host 110. In the write process, the read/write channel subjects the write data supplied from the hard disk controller 128 to code modulation, converts the resulting code-modulated write data to a write signal (current), and supplies the write signal to the magnetic head 122. The magnetic head 122 writes the data onto the magnetic disk 121 by invoking a current flow to a coil in accordance with the acquired signal. When data is to be supplied to the host 110, a read process is performed. In the read process, the read/write channel 127 extracts data from a read signal that is supplied from the magnetic head 122 and performs a decoding process. The resulting decoded read data is supplied to the hard disk controller 128.

The MPU 129 operates in accordance with a microcode loaded into the memory 130 for the purpose of exercising overall control of the hard disk drive 120, including positioning control of the magnetic head 122, interface control, and defect management, and performing necessary data processes. When the hard disk drive 120 starts up, the microcode running in the MPU 129 and the data required for control and data processing operations are loaded from the magnetic disk 121 or ROM (not shown) into the memory 130.

The digital data read by the read/write channel 127 includes the servo data in addition to the user data fed from the host 110. The servo controller 133 extracts the servo data from the read data acquired from the read/write channel 127. When the servo controller 133 acquires the servo data, it outputs a sector pulse for each sector. The extracted servo data includes track data, sector data, and burst pattern. The sector pulse and the extracted servo data are transferred from the servo controller 133 to the MPU 129. In accordance with the microcode, the MPU 129 uses the servo data to perform a positioning control process for the magnetic head 122. VCM control data, which is fed from the MPU 129, is set in a register of the motor driver unit 134. In accordance with the VCM control data that is set, the VCM driver 135 supplies a drive current to the VCM 126 to turn the head stack assembly 123.

In accordance with the microcode, the MPU 129 sets SPM control data in the register of the motor driver unit 134 to provide rotation control of the spindle motor 125. The SPM driver 136 exercises rotation control of the spindle motor 125 in compliance with the SPM control data that is set. The SPM driver 136 supplies a drive current having a specified waveform to the spindle motor 125 for the purpose of rotating the spindle motor 125 in a preferred state. Further, the SPM driver 136 detects the rotor position or rotational speed in order to provide optimum rotation control. Spindle motor control provided by the SPM driver 136 will be described in detail later.

The hard disk controller 128 has a function for interfacing with the host 110. The hard disk controller 128 therefore receives user data, read command, write command, and other commands from the host 110. The received user data is transferred to the read/write channel 127. The data read from the magnetic disk, which is acquired from the read/write channel 127, is transmitted to the host 110. Further, the hard disk controller 128 performs a code generation process on the user data acquired from the host 110 for error correction (ECC) purposes. In addition, the hard disk controller 128 performs an error correction process on read data that is read from the magnetic disk 121.

The control of the spindle motor 125, which is exercised in the hard disk drive 120 according to the present embodiment, will now be described. The SPM driver 136 controls the spindle motor 125 in compliance with microcode instructions that are executed by the MPU 129. Typically, a 3-phase sensorless DC motor is used as the spindle motor 125. For spindle motor control purposes, startup control and rotation control are exercised. Startup control is exercised to start up the spindle motor 125 that is at a standstill. Rotation control is exercised to control the spindle motor 125 after its startup. Rotation control exercised after the spindle motor 125 is started will be described in detail below. In spindle motor control according to the present embodiment, the drive current waveform to be supplied to the spindle motor 125 is varied. At the time when the drive current waveform changes, a transition process is performed as part of feedback processing for spindle motor control. The transition process will be described in detail later.

Figure 2:
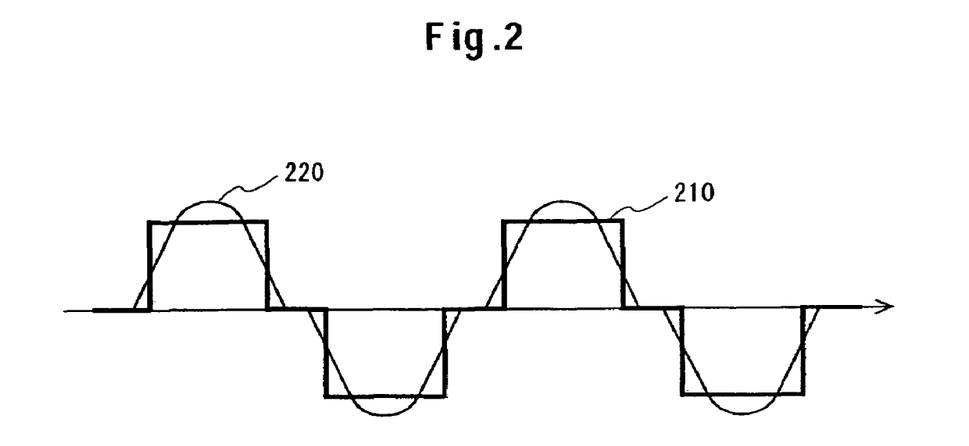
FIG. 2 schematically shows the drive current waveform of a spindle motor according to one embodiment of the present invention.

The drive current waveform for the spindle motor 125 will now be described. As explained above, the drive current is supplied from the SPM driver 136 to the spindle motor 125. FIG. 2 schematically shows two drive current waveforms that are used during spindle motor drive control according to the present embodiment. FIG. 2 indicates chronological changes in the drive current that is supplied, for instance, to one coil of a 3-phase sensorless DC motor. In spindle motor drive control according to the present embodiment, a square wave 210 and a curved wave 220 are selectively used as desired waveforms. In FIG. 2, these two waveforms are superposed on each other for explanation purposes. Preferably, the curved wave 220 is formed on the basis of a single-frequency sine wave.

When the spindle motor 125 starts up (begins to rotate), the square wave 210 allows the spindle motor 125 to drive in order to quickly raise the rotational speed to its steady state. At a predefined subsequent time, the drive current waveform changes from the square wave 210 to the curved wave 220. From the standpoint of silencing the spindle motor 125 (for noise reduction), it is preferred that the spindle motor 125 be driven by the curved wave 220. The curved wave 220 has a smaller amount of different frequency components, particularly high-frequency components, than the square wave 210. Therefore, the curved wave 220 can suppress the high-frequency sound that is generated by the spindle motor 125 during its rotation. It should be noted that the drive current waveform is not limited to those shown in FIG. 2. For example, a linear wave (trapezoidal wave, sawtooth wave, etc.) having a lower slew rate than the square wave 210 and a curvilinear wave different from the curved wave 220 may also be used. From the standpoint of silencing, a waveform having a much lower slew rate is used. In FIG. 2, the slew rate of the curved wave is lower than that of the square wave.

Figure 3:
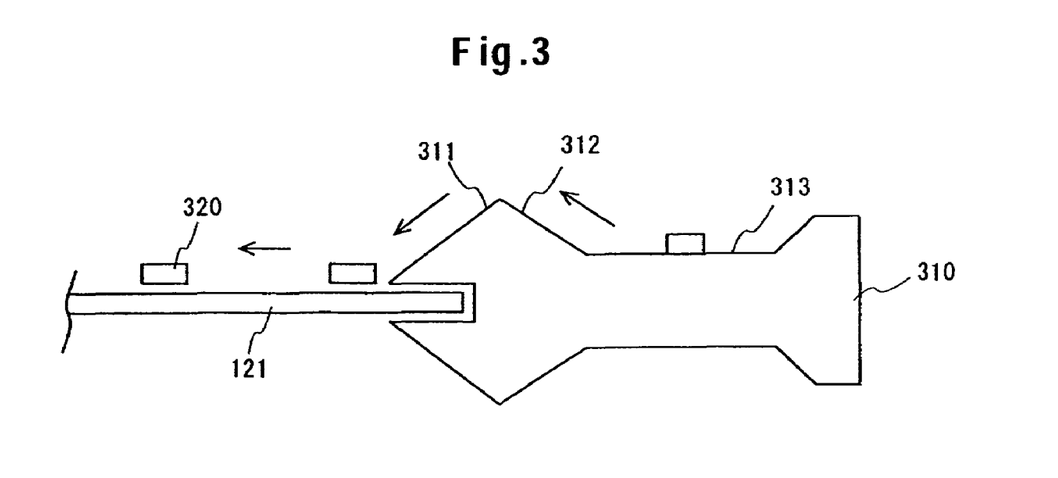
FIG. 3 schematically shows how a magnetic head moves during a loading process according to one embodiment of the present invention.

In the present embodiment, the drive current waveform changes depending on the position of the magnetic head 122. The drive current waveform changes from the square wave 210 to the curved wave 220 particularly when the magnetic head 122 is positioned above the rotating magnetic disk. FIG. 3 illustrates the relationship between the magnetic head position and drive current waveform change timing. In FIG. 3, the reference numeral 310 denotes a ramp on which the magnetic head 122 rests when no access is attempted, whereas the reference numeral 320 denotes a tab at the tip of the actuator to which the magnetic head 122 is secured. The actuator is driven by the VCM 126 to pivotally move around the pivot and move the magnetic head 122.

To read/write data, the actuator moves the magnetic head to a data area on the rotating magnetic disk surface (loading process). During the loading process, as shown in FIG. 3, the tab 320, which is first retained on a parking surface 313, moves up slope 312 in the loading direction while sliding, moves down slope 312 in the loading direction while sliding, and leaves the ramp 310 to move to a position above the surface of the magnetic disk 121. When the disk stops rotating, the actuator turns toward the ramp 310 and mounts on the ramp 310 to unload the magnetic head 122. In such an unloading process, the tab 320 moves up ramp slope 311 in the unloading direction while sliding, moves down slope 312, and reaches the flat parking surface 313.

The drive current waveform changes at a predetermined time while the magnetic head 122 is positioned above the rotating magnetic disk. Preferably, the waveform changes upon completion of the loading process. The loading process is completed when the magnetic disk 121 steadily rotates at a predetermined speed after the magnetic head 122 is loaded onto the magnetic disk 121. Preferably, the drive current waveform changes when the servo data on the magnetic disk 121 is read a predetermined number of times (e.g., 5 times).

When the magnetic head 122 moves to a position above the rotating magnetic disk 121, air friction occurs between the magnetic head 122 and magnetic disk 121. The force of air friction acts as a disturbance to the spindle motor 125, thereby increasing the load on the spindle motor 125. If this condition is allowed to continue, the rotational speed of the magnetic disk 121 significantly lowers. To minimize the change in the rotational speed of the spindle motor 125, the feedback system controls the drive current of the spindle motor 125. Feedback control will be described in detail later. The drive current is supplied in accordance with the difference between the rotational speed of the magnetic disk 121 and the reference value.

In the loading process for the magnetic head 122, the drive current (I) needs to be increased to resist the air friction. The maximum drive current value is basically determined according to the input voltage (Vp), the back electromotive voltage (Vb) of the spindle motor 125, the resistance value (Rm) of the spindle motor 125, and the output resistance value (Rd) of the SPM driver 136. It is necessary that the product of the drive current (I) and [Rm+Rd] be smaller than the difference between the input voltage and back electromotive voltage (Vp−Vb). As shown in FIG. 2, the maximum drive current value of the square wave 210 is smaller than that of the curved wave 220. Therefore, the square wave 210 has a greater margin for a significant increase in the drive current than the curved wave 220.

In the loading process according to the present embodiment, the drive current of the square wave 210 drives the spindle motor 125. When the square wave 210, which can properly handle greater current changes, is used for drive purposes, effective rotation control can be exercised in the loading process in which the load on the spindle motor 125 abruptly changes. Especially, a greater voltage margin can be provided. Therefore, SPM drivers having various characteristics can be used. The use of the square wave is particularly useful when an SPM driver having a great output resistance value is used. Further, the availability of an increased voltage margin is particularly beneficial for a hard disk drive having a large number of magnetic disks and a great back electromotive voltage. When the loading process is completed and the spindle motor 125 steadily rotates, the drive waveform changes from the square wave 210 to the curved wave 220. This makes it possible to exercise effective rotation control and contribute to noise reduction.

Figure 4:
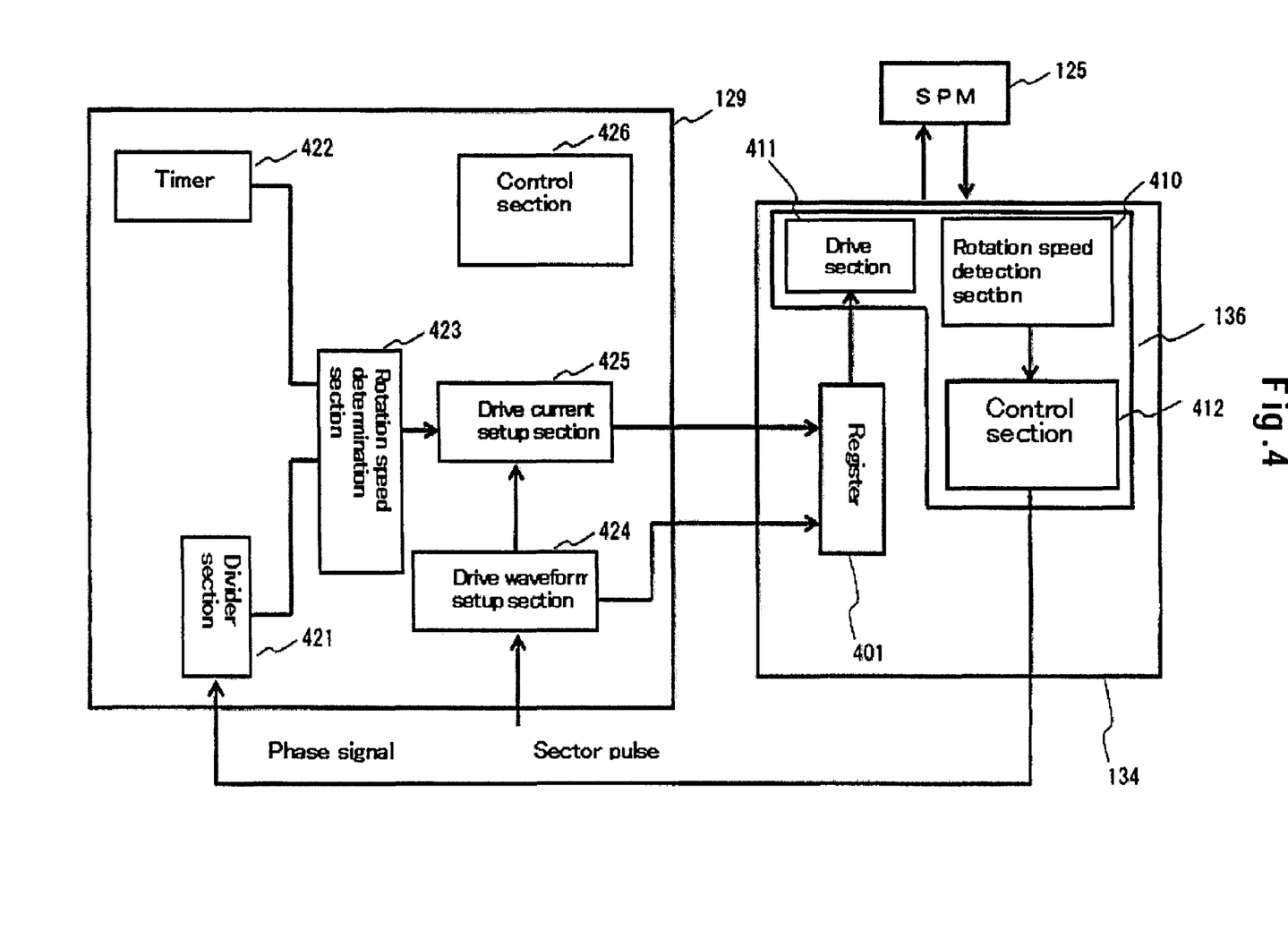
FIG. 4 is a block diagram that illustrates the logical configuration for spindle motor control according to one embodiment of the present invention.

FIG. 4 is a block diagram illustrating the logical configuration for controlling the spindle motor 125 in accordance with the present embodiment. The SPM driver 136 controls the spindle motor 125 in compliance with microcode instructions that are executed by the MPU 129. The MPU 129 cooperates with the SPM driver 136 in order to control the spindle motor 125. The MPU 129 and SPM driver 136 function as the motor control section. Rotation control of the running spindle motor 125 will be described below.

Referring to FIG. 4, the motor driver unit 134 includes the SPM driver 136 and the register 401, which stores control data fed from the MPU 129. The SPM driver 136 includes a rotational speed detection section 410, a drive section 411, and a control section 412. The MPU 129 implements various functions when it executes microcodes. As shown in FIG. 4, the MPU 129 performs the functions of a divider section 421 for dividing an input signal, a timer 422 for measuring the time, a rotational speed determination section 423, a drive current setup section 425, a drive waveform setup section 424, and a control section 426.

Each component will now be described. The register 401 stores control data fed from the MPU 129. In the present embodiment, the register 401 stores drive current data, which identifies a drive current value, and drive waveform data, which identifies a drive current waveform. The drive section 411 supplies a specified drive current to the spindle motor 125 under control of the control section 412. The drive section 411 supplies a current value according to the drive current data and a drive current having a waveform according to the drive waveform data. The rotational speed detection section 410 detects a back electromotive voltage that is induced on a stator coil depending on the rotation of the spindle motor 125, thereby determining the rotational speed of the spindle motor 125. The output from the rotational speed detection section 410 is delivered to the MPU 129 via the control section 412 as a phase signal. Phase signal generation is timed according to the actual rotation of the spindle motor 125. In the present embodiment, the output delivers 6 cycles of the phase signal for every revolution of the magnetic disk 121.

The divider section 421 divides a phase signal input from the SPM driver 136 to generate a signal that corresponds to one revolution of the magnetic disk 121. In the present embodiment, the divider section 421 divides the phase signal by 6. In accordance with the signal fed from the SPM driver 136, the rotational speed determination section 423 determines the actual rotational speed of the spindle motor 125. In the present embodiment, the rotational speed determination section 423 determines the actual rotational speed of the spindle motor 125 from the signal fed from the timer 422 and the signal fed from the divider 421. The cycle of signaling from the divider section 421 corresponds to the time for one revolution of the magnetic disk 121. Therefore, the rotational speed determination section 423 can determine the actual rotational speed of the spindle motor 125 by comparing the time measured by the timer 422 against the cycle of signaling from the divider section 421.

The drive waveform setup section 424 sets the drive waveform of the drive current that the SPM driver 136 supplies to the spindle motor 125. More specifically, the drive waveform setup section 424 sets the drive waveform data, which identifies a drive current waveform, in the register 401 of the motor drive unit 134. In the present embodiment, the drive waveform setup section 424 selectively sets the square wave 210 and curved wave 220 as a drive waveform as described above. The drive waveform setup section 424 first sets the square wave 210 and then switches to the curved wave. Drive waveform setup is performed in accordance with the position of the magnetic head 122. The drive waveform data is set at the time when the magnetic head 122 is loaded and positioned above the magnetic disk 121. In particular, the drive waveform changes at the time when the magnetic disk 121 steadily rotates to conclude the loading process.

The drive waveform setup section 424 receives a sector pulse input from the servo controller 133. Upon servo data detection, the servo controller 133 generates sector pulses that correspond to the servo data of various sectors. The drive waveform setup section 424 concludes that loading is completed in accordance with the sector pulses, and changes the selected drive waveform from the square wave 210 to the curved wave 220. When, in the present embodiment, the drive waveform setup section 424 successively acquires a sector pulse a predetermined number of times (e.g., 5 times), it concludes that loading is completed.

The drive current setup section 425 sets the current that the SPM driver 136 supplies to the spindle motor 125. More specifically, the drive current setup section 425 sets drive current data, which identifies a drive current value, in the register 401 of the motor driver unit 134. The drive current setup section 425 functions as a feedback system, compares the actual rotational speed, which is determined by the rotational speed determination section 423, against a previously stored target speed, and determines the drive current value in accordance with the result of comparison. The drive current value is determined by the feedback system in such a manner that the actual rotational speed approximates the target speed. The drive current setup section 425 sets the drive current data in synchronism with the rotation of the magnetic disk 121, and sets the drive current data in the register 401 for every revolution of the magnetic disk 121 as is the case with the rotational speed determination section 423.

Further, the drive current setup section 425 controls a drive current determination process in accordance with the drive waveform of the drive current. The drive waveform setup section 424 passes drive waveform identification data to the drive current setup section 425. In accordance with the passed data, the drive current setup section 425 detects a drive waveform change and exercises drive current setup process control. The internal process that the drive current setup section 425 performs for drive current setup will be described later in detail.

Figure 5:
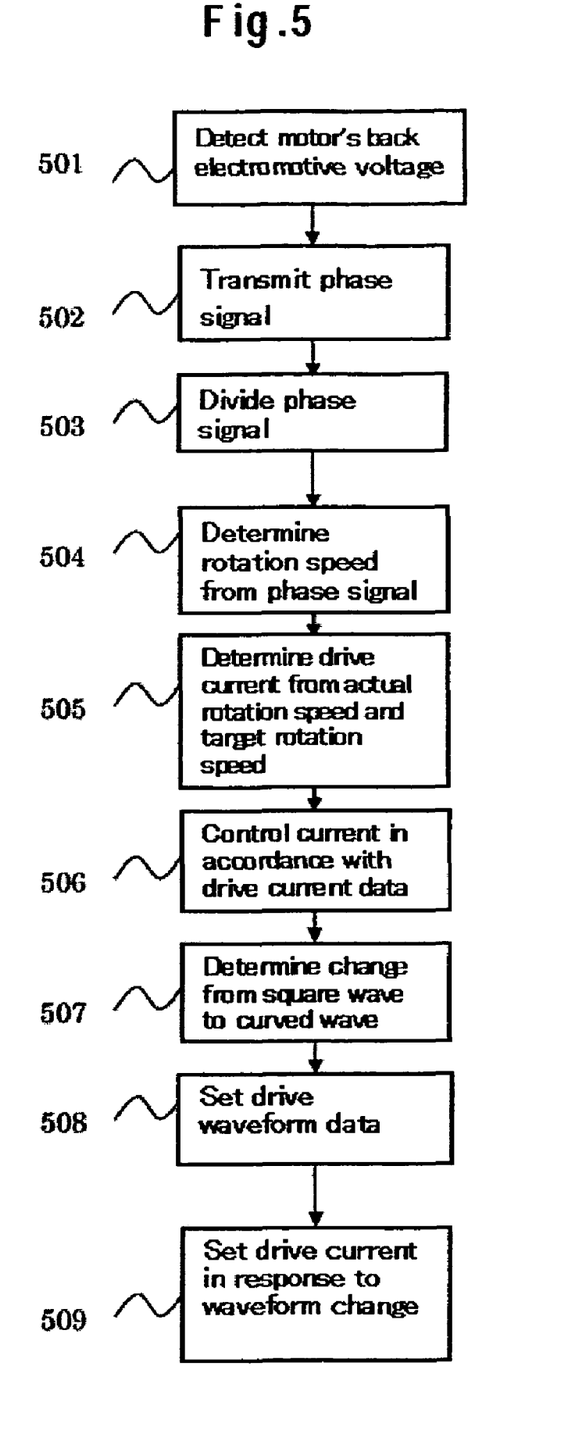
FIG. 5 is a flowchart that illustrates a spindle motor control process according to one embodiment of the present invention.

The overall operation of a logical configuration shown in FIG. 4 will now be described with reference to FIG. 5. After the startup process is completed by the SPM driver 136, the rotational speed detection section 410 detects the substantial rotational speed by detecting changes in the back electromotive voltage of the spindle motor 125 (step 501). When the startup process is completed, the drive section 411 is driven to rotate the spindle motor 125 with a square-wave drive current, and the magnetic head 122 rests on the ramp. The control section 412 generates a phase signal in accordance with the output from the rotational speed detection section 410, and transmits the generated phase signal to the MPU 129 (step 502).

The divider section 421 acquires the phase signal and divides it by 6 (step 503). The rotational speed determination section 423 compares the time measured by the timer 422 against the cycle of the divided signal and calculates the actual rotational speed of the spindle motor (step 504). The drive current setup section 425 acquires the actual rotational speed from the rotational speed determination section 423 and compares the actual rotational speed against the target rotational speed to determine the drive current. Further, the drive current setup section 425 sets drive current data in the register 401 (step 505). Under control of the control section 412, the drive section 411 controls the drive current value in accordance with the drive current data that is set in the register (step 506).

When the magnetic head 122 is loaded from the ramp to a position above the magnetic disk 121 and the servo controller 133 acquires servo data, sector pulses enter the MPU 129. In response to the sector pulse input that has been repeated a predetermined number of times, the drive waveform setup section 424 determines that the drive waveform should change from the square wave to the curved wave (step 507). The drive waveform setup section 424 sets the drive waveform data, which indicates the curved wave, in the register 401 (step 508). In addition, the drive current setup section 425 is notified of a drive waveform change.

In response to the drive waveform change, the drive current setup section 425 changes the drive current setup process and sets the drive current data in the register 401 (step 509). More specifically, the gain of the feedback system changes in response to the drive waveform change. Further, when the drive waveform changes, the drive current data is set in the register 401 in a manner different from that is used for normal operations (transition process). These operations as well as the process control exercised by the drive current setup section 425 will be described later in detail. When the drive waveform data is set in the register 401, the drive section 411, which is controlled by the control section 412, changes the drive waveform from the square wave to the curved wave. After the transition process is performed due to a drive waveform change, the same process as described above is repeated. The drive section 411 drives the spindle motor 125 with a drive current having a curved waveform in accordance with the drive current data that is set in the register 401.

Figure 6:
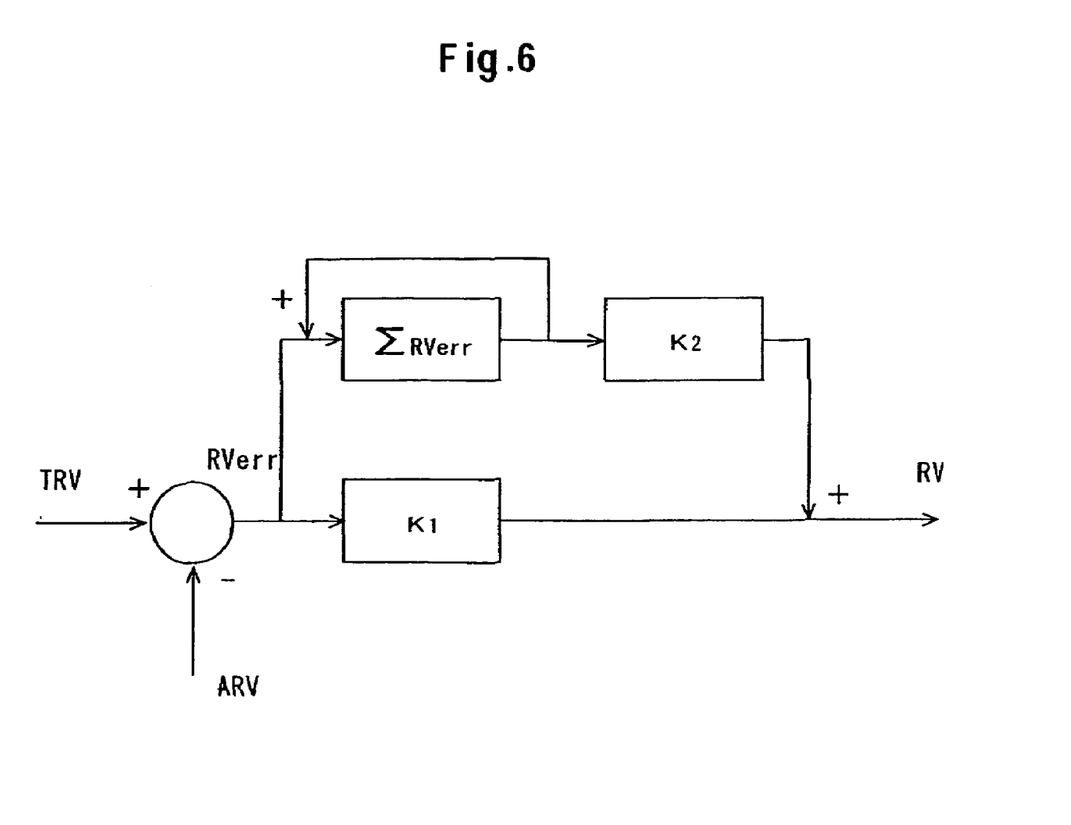
FIG. 6 illustrates the logical configuration of a feedback system for a drive current setup section according to one embodiment of the present invention.

The configuration and operation of the drive current setup section 425 will now be described. FIG. 6 shows how the feedback system 500 of the drive current setup section 425 according to the present embodiment is configured. The feedback system determines the drive current in accordance with the difference (RVerr) between the target rotational speed (TRV) and the actual rotational speed (ARV), which is acquired from the rotational speed determination section 423. First of all, the difference (RVerr) between the target rotational speed (TRV) and actual rotational speed (ARV) is calculated. The difference (RVerr) is then multiplied by the gain K1 to obtain the value RVerr·K1. Further, the sigma (ΣRVerr) of the difference (RVerr) is calculated and multiplied by the gain K2 to obtain the value ΣRVerr·K2. The drive current value is calculated from the values RVerr·K1 and ΣRVerr·K2.

In response to the drive waveform change, the drive current setup section 425 applies a gain change. The change is applied to either or both of the gains K1 and K2. Since, in the present embodiment, the square wave 210 and curved wave 220 differ in drive torque, gain setup is performed in accordance with the drive waveform. More specifically, the torque provided by the square wave 210 is lower than the torque provided by the curved wave 220, and the gain of the square wave 210 is higher than the gain of the curved wave 220. Since the gain of the square wave 210 is relatively high, it is possible to prevent the rotational speed of the magnetic disk 121 from being significantly decreased by loading-induced windage when the spindle motor is driven by the square wave 210 at the time of loading.

Figure 7:
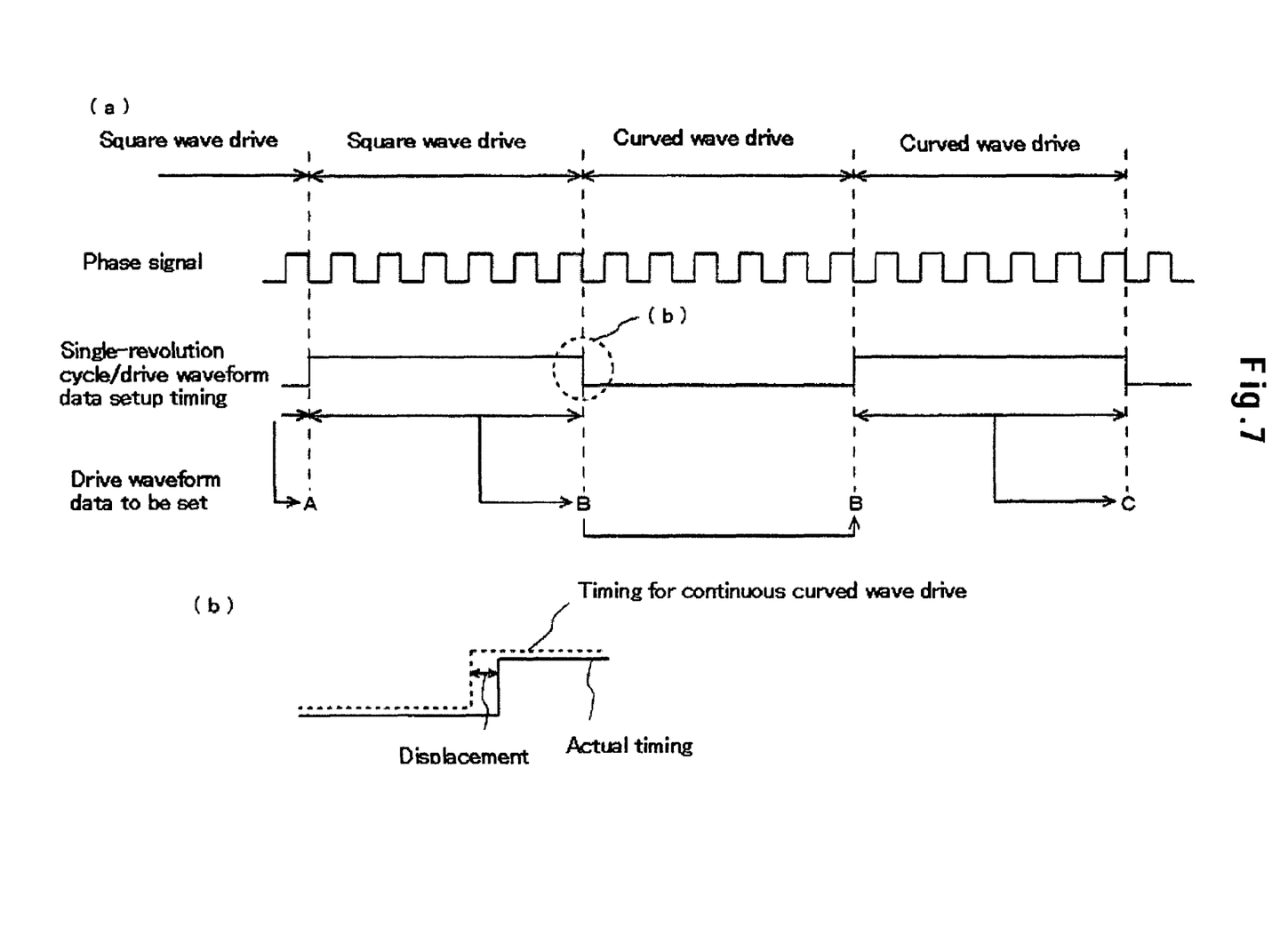
FIGS. 7(a) and 7(b) are timing diagrams illustrating a drive current setup process that is performed during a drive waveform change timing cycle according to one embodiment of the present invention.

FIG. 7(a) is a timing diagram illustrating a process that is performed by the drive current setup section 425. As shown in FIG. 7(a), six cycles of the phase signal correspond to one revolution of the magnetic disk 121. Drive current data setup is performed in synchronism with the phase signal or rotation cycle. The drive current data is determined according to the difference between the actual rotational speed and target rotational speed. The actual rotational speed is determined by measuring the length of time for 6 cycles of the phase signal (single-revolution cycle). Therefore, the present drive current data can be determined by measuring the length of time for 6 cycles of the phase signal from the instant at which the previous drive current data was measured. For example, the actual rotational speed is determined by measuring the length of time between the instant at which drive current data A is determined and the instant at which 6 cycles of the phase signal elapse. In accordance with the determined rotational speed, the drive current setup section 425 sets drive current data B.

In drive current data setup, which is performed immediately after a drive waveform change, the drive current setup section 425 according to the present embodiment determines the drive current independently of the phase signal prevailing after the drive waveform change or the detection signal of the rotational speed detection section. More specifically, the calculation process corresponding to the difference between the actual rotational speed and target rotational speed is skipped. The drive current setup section 425 sets data B, which is the same as previously set drive current data B, in the register 401. During the subsequent timing cycle, the normal calculation process is performed to set the drive current data. In FIG. 7(a), drive current data C is set by measuring the length of time for 6 cycles of the phase signal after drive current data B is reset.

When the drive current varies, the detection operation performed by the SPM driver 136 may be disturbed so as to displace the generated phase signal. Therefore, even when the actual rotational speed is not significantly changed, the rotational speed determination section 423 or drive current setup section 425 may erroneously recognize that the rotational speed is changed. FIG. 7(b) exemplifies a timing shift which results from a drive waveform change. Because of phase signal disturbance caused by a drive waveform change, the actually detected length of a single revolution cycle is shifted with respect to a timing assumed for continuous curved wave driving. Consequently, the measured length of time for a single revolution cycle deviates from the proper value so that the calculated rotational speed is incorrect.

Figure 8:
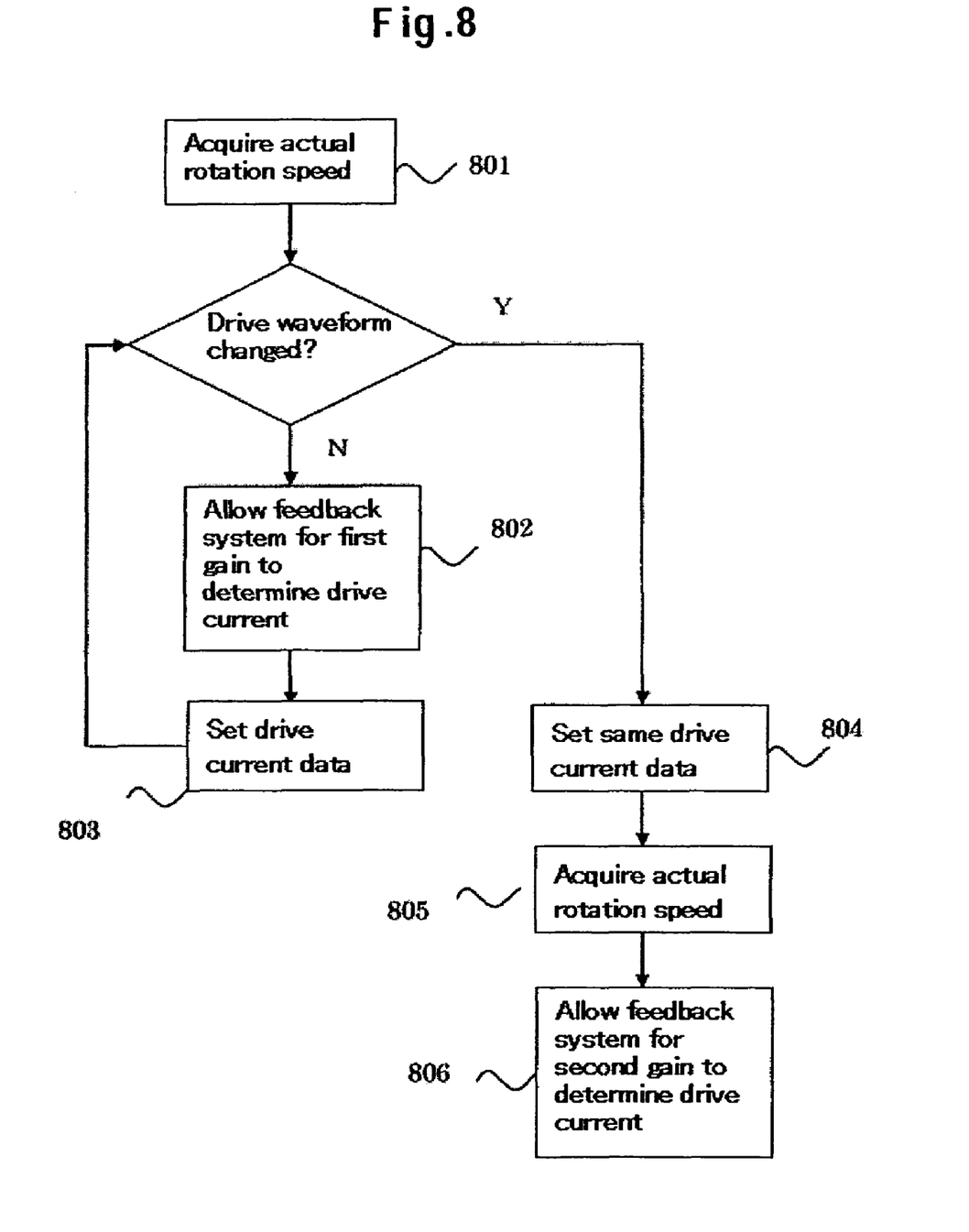
FIG. 8 is a flowchart illustrating a drive current setup process that is performed during a drive waveform change timing cycle according to one embodiment of the present invention.

The setup process that is performed by the drive current setup section 425 in accordance with a waveform change will now be described with reference to FIGS. 7A, 7B, and 8. The drive current setup section 425 acquires the actual rotational speed from the rotational speed determination section 423 (step 801). If the drive waveform is not changed, the feedback system for the first gain determines the drive current (step 802). Step 803 is then performed to set the drive current data corresponding to the drive current in the register 401. If the waveform data changes to a curved wave during the next timing cycle, step 804 is performed to determine the drive current without allowing the feedback system to perform a process, and set the same drive current data as for the immediately preceding timing cycle in the register 401. During the next timing cycle, the actual rotational speed is acquired from the rotational speed determination section 423 (step 805). The feedback system for the second gain then determines the drive current (step 806). Subsequently, processing steps 805 and 806 are repeated.

When the drive current data is to be set up for the first time after a drive waveform change, it is possible to avoid an incorrect actual rotational speed calculation and incorrect drive current setup by skipping the feedback calculation sequence. In this manner, the spindle motor can be prevented from erratically rotating due to improper control. Since the rotational speed change occurring after a drive waveform change is considered to be small, it is preferred that the same drive current data as the previous data be set. Alternatively, it is also possible to set the spindle motor in a free-running state without setting the drive current data (this means that the drive current is zero). Another alternative is to set a predefined default value as the drive current data. The feedback calculation sequence can be skipped once or a multiple number of times.

When the same rotational speed as the previous one is passed to the drive current setup section 425 as the actual rotational speed without having a determination process to be performed by the rotational speed determination section 423, it is possible to prevent the rotational speed from being incorrectly determined due to a displaced phase signal or prevent the drive current from being incorrectly set. The present invention can be applied not only to a data storage device for data recording and reproducing but also to a data storage device for data reproducing only or data recording only. For use in the latter application, the magnetic head comprises a read element only or a write element only. The present invention is applicable not only to magnetic storage devices but also to various other types of data storage devices such as optical or magneto-optical storage devices. Further, the present invention is also applicable to various devices for performing a motor startup process as well as to data storage devices.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A storage device control method for a storage device comprising a storage disk, a motor to rotate said storage disk, and a head to access a storage area of said storage disk, said storage device control method comprising:

(a) acquiring a signal for detecting the rotational speed of said motor;

(b) determining the rotational speed of said motor in accordance with said acquired signal;

(c) comparing said determined rotational speed against a target speed and determining a drive current that is to be supplied to said motor with predefined timing;

(d) changing a waveform of the drive current to be supplied to said motor, wherein at least a part of the waveform of the drive current being changed is a linear wave; and (e) determining, during a first timing cycle after said waveform change, the drive current to be supplied to said motor independently of the signal for said rotational speed detection after said waveform change.

2. The storage device control method according to claim 1, wherein the drive current determined in said step (e) is the same as the drive current that is determined during a timing cycle immediately preceding the first timing cycle after said waveform change.

3. The storage device control method according to claim 1, wherein said step (d) is performed to change the waveform of the drive current to be supplied to said motor during a timing cycle during which said head is positioned above said storage disk which is rotating.

4. The storage device control method according to claim 3, further comprising acquiring servo data from said storage disk, wherein said step (d) is performed to change the waveform of said drive current during a timing cycle that is determined according to said servo data.

5. The storage device control method according to claim 4, wherein said step (d) is performed to change the waveform of said drive current during a timing cycle during which servo data is successively acquired a predetermined number of times.

6. The storage device control method according to claim 1, further comprising moving, prior to said step (d), said head from outside of said magnetic disk to a position above said magnetic disk which is rotating, wherein said step (d) is performed to change the waveform of the drive current to be supplied to said motor during a timing cycle during which said head is positioned above said storage disk which is rotating.

7. The storage device control method according to claim 6, wherein the waveform of said drive current changes from a first waveform to a second waveform in said step (d), and wherein a maximum current value of said first waveform is smaller than a maximum current value of said second waveform.

8. The storage device control method according to claim 6, further comprising repeating said steps (a) through (c) after completion of said step (e), wherein a feedback process for a first gain is performed to determine the drive current in said step (c) that precedes said step (e), and wherein a feedback process for a second gain, which is smaller than said first gain, is performed to determine the drive current in said step (c) that follows said step (e).

9. The storage device control method according to claim 1, wherein the waveform of said drive current changes from a first waveform to a second waveform in said step (d), and wherein a slew rate of second waveform is lower than a slew rate of said first waveform.

10. The storage device control method according to claim 1, wherein changing the waveform of the drive current to be supplied to the motor comprises changing the waveform from a linear wave to a curved wave or vice versa.

11. A motor control method, comprising:

(a) acquiring a signal for detecting the rotational speed of a motor from said motor;

(b) determining the rotational speed of said motor in accordance with said acquired signal;

(c) determining, in accordance with a difference between said determined rotational speed and a target speed, a drive current that is to be supplied to said motor;

(d) supplying said determined drive current to said motor;

(e) changing a waveform of the drive current to be supplied to said motor, wherein at least a part of the waveform of the drive current being changed is a linear wave;

(f) determining, during a first timing cycle after said waveform change, a drive current to be supplied to said motor independently of the signal for said rotational speed detection after said waveform change; and (g) supplying to said motor the drive current that is determined after said waveform change.

12. The motor control method according to claim 11, wherein the drive current determined in said step (f) is the same as the drive current that is determined during a timing cycle immediately preceding the first timing cycle after said waveform change.

13. The motor control method according to claim 11, wherein the signal for said rotational speed detection is generated when a voltage induced on a coil of said motor is detected.

14. The motor control method according to claim 11, wherein changing the waveform of the drive current to be supplied to the motor comprises changing the waveform from a linear wave to a curved wave or vice versa.

15. A storage device including a storage disk, a motor to rotate said storage disk, and a motor control section to control said motor, said motor control section comprising:

a signal acquisition section configured to acquire a signal generated according to a rotation of said motor from said motor;

a rotational speed determination section configured to determine the rotational speed of said motor in accordance with said acquired signal;

a waveform determination section configured to determine the waveform of a drive current that is to be supplied to said motor, wherein at least a part of the waveform of the drive current is a linear wave;

a drive current determination section configured to determine, in accordance with the rotational speed determined by said rotational speed determination section and a predetermined rotational speed, a drive current value that is to be supplied to said motor with predefined timing, and to determine, during a first timing cycle after a change in the waveform of said drive current, said drive current value independently of said signal prevailing after said drive waveform change; and a drive section configured to supply to said motor a drive current that corresponds to the drive current value determined by said drive current determination section and the drive waveform determined by said waveform determination section.

16. The storage device according to claim 15, further comprising a head configured to access a storage area of said disk, wherein said drive waveform changes during a timing cycle during which said head is positioned above said disk.

17. The storage device according to claim 16, further comprising a servo data acquisition section configured to acquire servo data from said storage disk, wherein said drive waveform determination section changes the drive waveform from a first drive waveform to a second drive waveform during a timing cycle determined according to said acquired servo data.

18. The storage device according to claim 15, further comprising a head configured to access a storage area of said disk and a movement mechanism configured to move said head, wherein, when said head is positioned above said disk after being moved by said movement mechanism from outside of said disk to a position above said disk which is rotating, said drive waveform determination section determines said drive waveform in such a manner that the drive waveform changes from a first drive waveform to a second drive waveform, and wherein a maximum current value of said first drive waveform is smaller than a maximum current value of said second drive waveform.

19. The storage device according to claim 15, further comprising a head configured to access a storage area of said disk and a movement mechanism configured to move said head, wherein, when said head is positioned above said disk after being moved by said movement mechanism from outside of said disk to a position above said disk which is rotating, said drive waveform determination section determines said drive waveform in such a manner that the drive waveform changes from a first drive waveform to a second drive waveform; wherein said drive current determination section causes a feedback system to determine said drive current value in such a manner that the rotational speed determined by said rotational speed determination section approximates said predetermined rotational speed; and wherein a gain of said feedback system for said first drive waveform is higher than a gain of said feedback system for said second drive waveform.

20. The storage device according to claim 19, wherein the feedback system determines the drive current value by calculating a difference (RVerr) between the predetermined rotational speed (TRV) and the rotational speed (ARV) determined by the rotational speed determination section, multiplying the difference (RVerr) by a first gain K1 to obtain a value RVerrÿK1, calculating a sigma (ÿRVerr) of the difference (RVerr), multiplying the sigma (ÿRVerr) by a second gain K2 to obtain a value ÿRVerrÿK2, and calculating the drive current value from the values RVerrÿK1 and ÿRVerrÿK2.

21. The storage device according to claim 20, wherein the drive current determination section applies a gain change to one or both of the gains K1, K2 in response to a change in the waveform of the drive current.

22. The storage device according to claim 15, wherein the drive current value that said drive current determination section determines during the first timing cycle after a change in the waveform of said drive current is the same as the drive current value that is determined during a timing cycle immediately preceding said first timing cycle.

23. The storage device according to claim 15, wherein the drive section is further configured to set said motor in a free-running state.

24. The storage device according to claim 23, wherein the drive current is zero when said motor is in the free-running state.

25. The storage device according to claim 15, wherein the linear waveform is a square wave.

26. The storage device according to claim 15, wherein the waveform of the drive current that is to be supplied to the motor is a linear wave during start up of the motor, and is changed from the linear wave to a curved wave after the rotational speed of the motor reaches a steady state.

* * * * *